(12) United States Patent
Hodgson et al.

(10) Patent No.: US 12,294,194 B2
(45) Date of Patent: May 6, 2025

(54) DIODE-PUMPED SOLID-STATE LASER APPARATUS FOR LASER ANNEALING

(71) Applicant: Coherent, Inc., Santa Clara, CA (US)

(72) Inventors: Norman Hodgson, Belmont, CA (US); Andrea Caprara, Palo Alto, CA (US); Kai Schmidt, Leinefelde (DE)

(73) Assignee: Coherent, Inc., Santa Clara, CA (US)

( * ) Notice: Subject to any disclaimer, the term of this patent is extended or adjusted under 35 U.S.C. 154(b) by 863 days.

(21) Appl. No.: 16/741,486

(22) Filed: Jan. 13, 2020

(65) Prior Publication Data

US 2020/0235544 A1 Jul. 23, 2020

Related U.S. Application Data

(60) Provisional application No. 62/905,252, filed on Sep. 24, 2019, provisional application No. 62/795,341, filed on Jan. 22, 2019.

(51) Int. Cl.
*H01S 3/109* (2006.01)
*B23K 26/00* (2014.01)
(Continued)

(52) U.S. Cl.
CPC .......... *H01S 3/109* (2013.01); *B23K 26/0006* (2013.01); *B23K 26/0622* (2015.10); *B23K 26/064* (2015.10); *B23K 26/354* (2015.10); *H01S 3/0606* (2013.01); *H01S 3/08054* (2013.01); *H01S 3/094076* (2013.01); *H01S 3/0941* (2013.01); *H01S 3/115* (2013.01);
(Continued)

(58) Field of Classification Search
CPC .......... B23K 26/0006; B23K 26/0622; B23K 26/064; B23K 26/354; H01S 3/0606; H01S 3/094076; H01S 3/0941; H01S 3/005; H01S 3/08059; H01S 3/09415; H01S 3/2383
USPC ....................................................... 266/249
See application file for complete search history.

(56) References Cited

U.S. PATENT DOCUMENTS 6,285,702 B1 9/2001 Caprara et al.
6,650,480 B2 11/2003 Tanaka
(Continued)

FOREIGN PATENT DOCUMENTS

CN 1886872 A 12/2006
CN 101019078 A 8/2007
(Continued)

OTHER PUBLICATIONS

International Search Report and written Opinion received for PCT Patent Application No. PCT/US2020/013551, mailed on Jun. 29, 2020, 17 pages.
(Continued)

*Primary Examiner* — Jessee R Roe
*Assistant Examiner* — Michael Aboagye
(74) *Attorney, Agent, or Firm* — Morrison & Foerster LLP

(57) ABSTRACT

Laser annealing apparatus includes a plurality of frequency-tripled solid-state lasers, each delivering an output beam of radiation at a wavelength between 340 nm and 360 nm. Each output beam has a beam-quality factor ($M^2$) greater of than 50 in one transverse axis and greater than 20 in another transverse axis. The output beams are combined and formed into a line-beam that is projected on a substrate being annealed. Each output beam contributes to the length of the line-beam.

14 Claims, 16 Drawing Sheets

(51) Int. Cl.
  *B23K 26/0622* (2014.01)
  *B23K 26/064* (2014.01)
  *B23K 26/354* (2014.01)
  *H01S 3/06* (2006.01)
  *H01S 3/08* (2023.01)
  *H01S 3/094* (2006.01)
  *H01S 3/0941* (2006.01)
  *H01S 3/115* (2006.01)
  *H01S 3/16* (2006.01)
  *H01S 3/00* (2006.01)

(52) U.S. Cl.
  CPC .......... *H01S 3/1611* (2013.01); *H01S 3/1643* (2013.01); *H01S 3/0092* (2013.01)

(56) References Cited

U.S. PATENT DOCUMENTS

| | | | |
|---|---|---|---|
| 7,408,714 B2 | 8/2008 | Windpassinger et al. | |
| 7,615,722 B2 * | 11/2009 | Govorkov | B23K 26/0613 372/101 |
| 7,729,046 B2 * | 6/2010 | Kuhnelt | H01S 3/2383 372/71 |
| 7,932,185 B2 | 4/2011 | Kudo et al. | |
| 8,467,429 B2 * | 6/2013 | Gokay | H01S 3/113 372/75 |
| 10,008,821 B1 | 6/2018 | Goodno et al. | |
| 10,453,691 B2 | 10/2019 | Martinsen et al. | |
| 2002/0176471 A1 * | 11/2002 | Peressini | H01S 3/0941 372/92 |
| 2002/0196414 A1 | 12/2002 | Manni et al. | |
| 2005/0068998 A1 | 3/2005 | Katsura et al. | |
| 2005/0078718 A1 | 4/2005 | Spinelli et al. | |
| 2006/0114947 A1 | 6/2006 | Morita | |
| 2007/0201532 A1 * | 8/2007 | Zhang | H01S 3/081 372/72 |
| 2008/0014685 A1 | 1/2008 | Govorkov et al. | |
| 2008/0267241 A1 | 10/2008 | Brown et al. | |
| 2010/0278200 A1 | 11/2010 | Dicks et al. | |
| 2016/0259174 A1 | 9/2016 | Simon et al. | |
| 2017/0141530 A1 | 5/2017 | Courjaud | |
| 2018/0188633 A1 | 7/2018 | Chuang et al. | |
| 2020/0235544 A1 * | 7/2020 | Hodgson | H01S 3/1611 |

FOREIGN PATENT DOCUMENTS

| | | | |
|---|---|---|---|
| CN | 100377451 C | 3/2008 | |
| CN | 101636886 A | 1/2010 | |
| CN | 102801106 A | 11/2012 | |
| CN | 107636503 A | 1/2018 | |
| CN | 109193342 A | 1/2019 | |
| CN | 208955408 U | 6/2019 | |
| CN | 110998794 A | 4/2020 | |
| JP | 2004503923 A | 2/2004 | |
| JP | 2008159836 A | 7/2008 | |
| JP | 2020514795 A | 5/2020 | |
| KR | 20120004425 A | 1/2012 | |
| WO | WO-03071344 A1 * | 8/2003 | ....... H01L 21/02532 |

OTHER PUBLICATIONS

Invitation to Pay Additional Fees received for PCT Patent Application No. PCT/US2020/013551, mailed on Apr. 17, 2020, 12 pages.

Xu et al., "Comparison of intra-cavity THG between the single- and multi-pass operations", Optics and Laser Technology, vol. 97, 2017, pp. 354-357.

Zan et al., "Low Temperature Annealing with Solid-State Laser or UV Lamp Irradiation on Amorphous IGZO Thin-Film Transistors", Electrochemical and Solid-State Letters, vol. 13, No. 5, 2010, pp. H144-H146.

International Preliminary Report on Patentability received for PCT Patent Application No. PCT/US2020/013551, mailed on Jul. 27, 2021, 10 pages.

Extended European Search Report and Written Opinion received for European Patent Application No. 23220760.5, mailed on Apr. 12, 2024, 7 pages.

Paschotta, (2008). "Beam Quality in Second-Harmonic Generation," available online at <https://www.rp-photonics.com/spotlight_2008_01_27.html>, 3 pages.

Search Report received for Chinese Patent Application No. 202080010300.1, dated Jun. 17, 2024, 3 pages.

\* cited by examiner

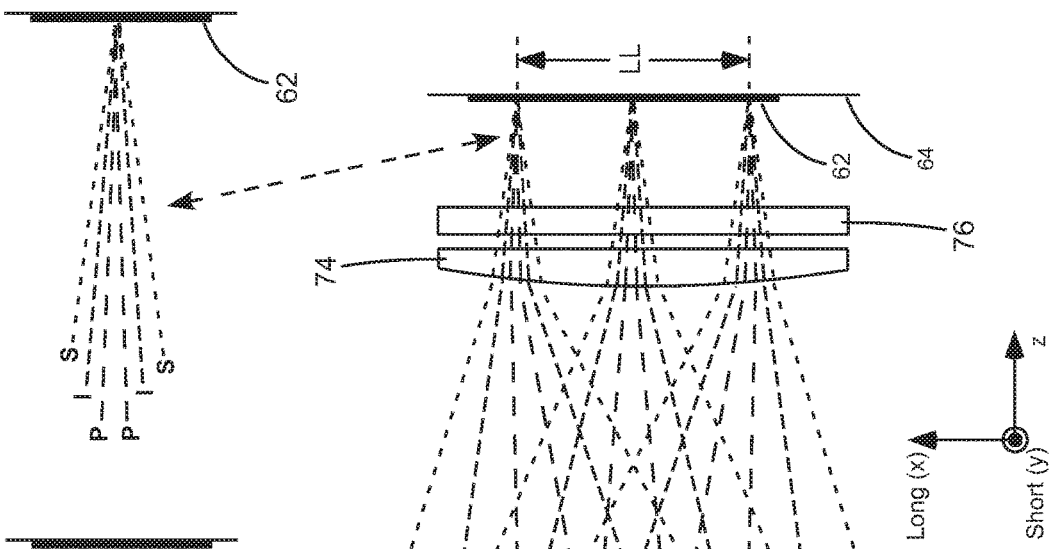
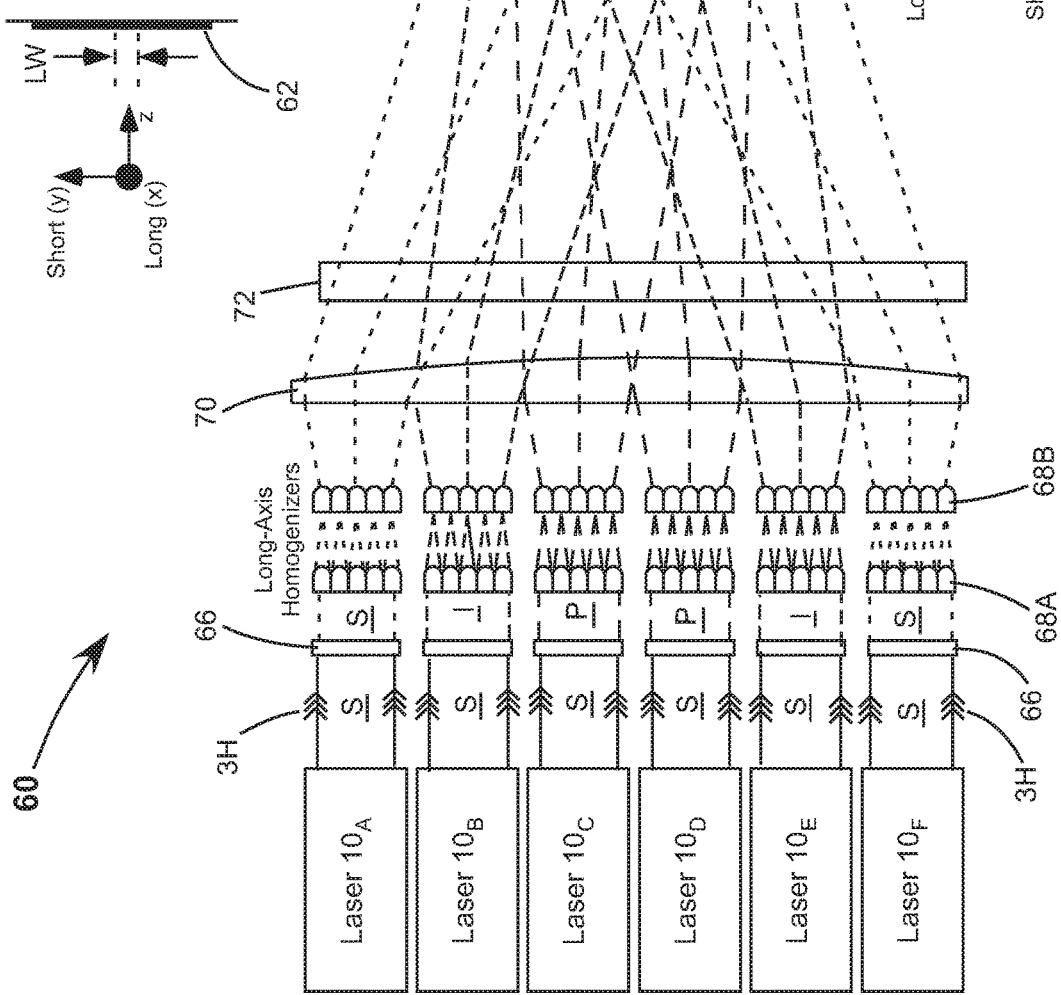

DIODE-PUMPED SOLID-STATE LASER APPARATUS FOR LASER ANNEALING

PRIORITY

This application claims priority to U.S. Provisional Patent Applications Ser. No. 62/795,341 filed on 22 Jan. 2019 and Ser. No. 62/905,252 filed on 24 Sep. 2019, the disclosures of which are incorporated herein by reference in their entirety.

TECHNICAL FIELD OF THE INVENTION

The present invention relates in general to annealing of amorphous silicon layers using ultraviolet laser-radiation projected into a line-beam. The invention relates in particular to annealing wherein laser-radiation from a plurality of lasers is combined and projected into the line-beam.

DISCUSSION OF BACKGROUND ART

Laser annealing is used to produce large high-resolution LCD and OLED displays by melting a thin amorphous silicon layer on a substrate, onto which thin-film transistors (TFTs) are to be defined, followed by crystallization of the cooling silicon. The annealing process requires a stable pulsed ultraviolet laser, with low RMS pulse-energy noise of less than about 1%, at a wavelength in a range between 280 nanometers (nm) and 360 nm. The laser-beam generated by the ultraviolet laser is formed into a line-beam that is scanned across the silicon layer. The laser-beam must have very-low beam-quality in order to form a speckle-free homogenous line-beam. Beam-quality is measured by the unit-less beam-quality factor $M^2$. Very-low beam-quality corresponds to a very-high value of $M^2$.

At present, such laser-beams are provided by a high-power excimer laser or a combination of such excimer lasers. For example, a xenon chloride (XeCl) excimer laser, which generates laser-radiation having a wavelength of 308 nm. Excimer lasers can be generally characterized as super-atmospheric gas-discharge lasers. The laser-beams have an elongated cross-section, characterized by a long axis and a short axis, corresponding respectively to length and width dimensions of a line-beam. The line-beam has a uniform or "flat-top" intensity distribution along both the length and width dimensions.

Typically, the $M^2$ values of a laser-beam from a XeCl excimer laser used for annealing are about 80 in the short axis and about 500 in the long axis, with $1/e^2$ full-width beam dimensions of about 20 millimeters (mm) in the short axis and about 45 mm in the long axis. Laser-beams from several such excimer lasers are combined and projected into a line-beam having a width of about 0.4 mm and a length of between about 750 mm and about 1500 mm. The required ultraviolet power-per-millimeter-of-length is about 2.5 watts (W), at a pulse-repetition frequency of about 600 hertz (Hz) and a pulse duration of about 25 nanoseconds (ns). For a line-beam length of 1500 mm, about 3.6 kilowatts (kW) of ultraviolet power is required, which can be achieved by combining the outputs of six individual 600 W lasers, each providing 1 joule (J) of pulse-energy.

One disadvantage of excimer lasers is a high capital cost, which is due, inter-alia, to a requirement for a complex gas tube that includes discharge electrodes and power supplies capable of delivering electrical pulses having peak voltages of greater than 30 kilovolts (kV) to these electrodes. Another disadvantage of excimer lasers is a high cost-of-operation, due to a limited gas-tube lifetime of less than one year and frequent replacement of gas-tube windows during that lifetime.

There is a need for ultraviolet laser-annealing apparatus having lower capital cost and lower cost-of-operation than excimer laser-annealing apparatus. Preferably, the laser-annealing apparatus would be capable of providing pulse-energies and beam-parameters comparable to those provided by the excimer laser-annealing apparatus discussed above.

SUMMARY OF THE INVENTION

In one aspect, optical apparatus for annealing a layer on a substrate in accordance with the present invention comprises a plurality of frequency-converted repetitively-pulsed solid-state lasers. Each laser delivers an output beam having a wavelength in the ultraviolet region of the electromagnetic spectrum, a cross-section characterized by mutually-orthogonal first and second transverse axes, a beam-quality factor $M^2$ in the first transverse axis of greater than about 50, and a beam-quality factor $M^2$ in the second transverse axis of greater than about 20. Laser pulses in each output beam have a pulse-energy greater than about 100 millijoules and a pulse-repetition frequency greater than about 100 hertz. The optical apparatus further includes a line-projector arranged to receive the output beams, form the output beams into a line-beam, and project the line-beam onto the layer. The line-beam has a length and a width on the layer.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 12A, FIG. 12B, and FIG. 12C schematically illustrate a preferred embodiment of a line-projector for combining the ultraviolet output beams of six lasers of FIG. 1A and forming a line-beam that is projected onto a silicon layer to be annealed.

DETAILED DESCRIPTION OF THE INVENTION

Figure 1A:
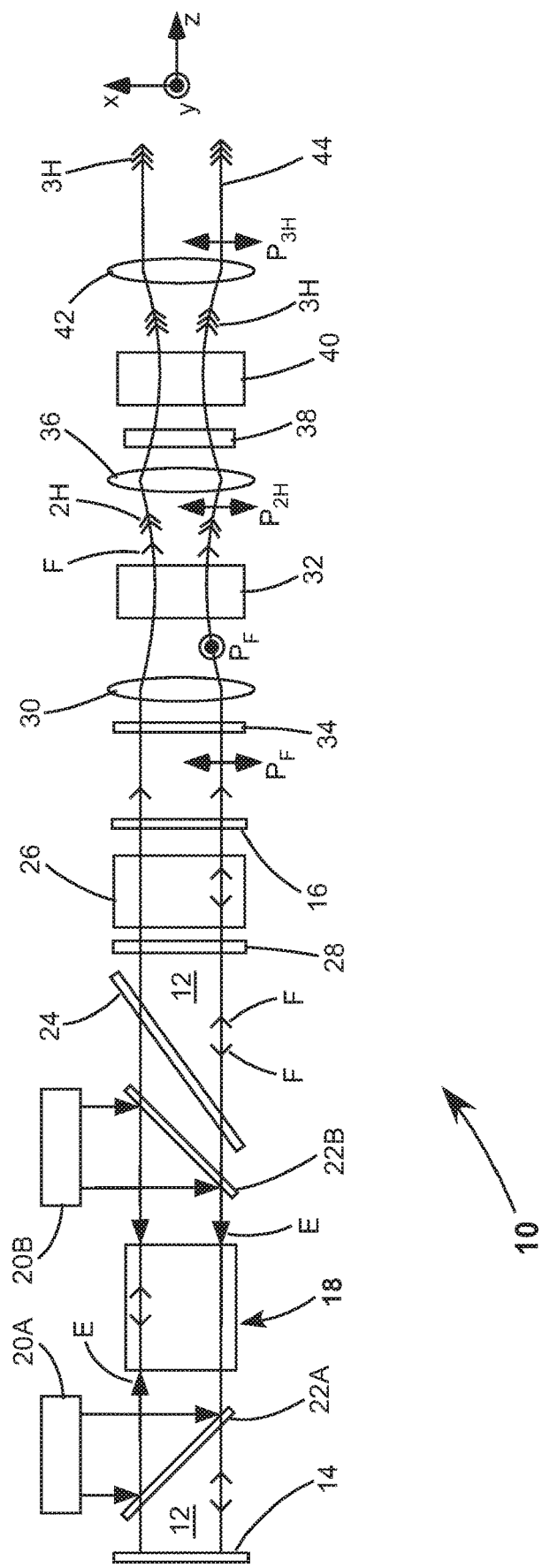
FIG. 1A schematically illustrates a preferred embodiment of an externally-frequency-tripled repetitively-pulsed solid-state laser in accordance with the present invention, having a gain-element in the form of a slab located in a resonator formed between a high-reflection resonator mirror and an output-coupling resonator mirror, the resonator producing an near-infrared beam having high beam-quality factor ($M^2$) values in long and short transverse axes, the near-infrared beam converted into a visible beam by a nonlinear crystal, the near-infrared and visible beams converted into an ultraviolet beam by another nonlinear crystal, the laser arranged and configured to deliver an ultraviolet output beam having an elongated cross-section and high $M^2$ values.

Turning now to the drawings, wherein like features are designated by like reference numerals, FIG. 1A schematically illustrates a preferred embodiment 10 of an externally-frequency-tripled repetitively-pulsed solid-state laser in accordance with the present invention. Laser 10 has a linear resonator 12 formed between a high-reflection resonator mirror 14 (HR mirror) and a partially-transmitting output-coupling resonator mirror 16 (OC mirror). Cartesian x-, y-, and z-axes are indicated on the drawing for reference.

Resonator 12 includes a gain-element 18 in the form of a slab that is located between resonator mirrors 14 and 16. Resonator 12 is depicted schematically in a perspective view in FIG. 1B. Other components within the resonator are omitted from FIG. 1B for simplicity of illustration. Gain-element 18 is energized by pump-radiation from two-dimensional diode-laser arrays 20A and 20B. The pump-radiation is indicated in FIG. 1A by arrowheads E. The pump-radiation is folded into the gain-element by dichroic mirrors 22A and 22B, respectively. By way of example, the gain-element can be a neodymium ($Nd^{3+}$) doped or ytterbium ($Yb^{3+}$) doped yttrium aluminum garnet (YAG) or yttrium orthovanadate ($YVO_4$) crystal. These crystals provide optical gain at wavelengths between about 1020 nm and about 1080 nm, characteristic of the dopant ion and crystal material, in the near-infrared region of the electromagnetic spectrum.

Energized gain-element 18 produces a beam of fundamental radiation, having a near-infrared wavelength, which circulates in resonator 12. This fundamental radiation is indicated by arrowheads F. The circulating fundamental-radiation is linearly polarized, having a polarization-orientation indicted by arrows $P_F$. This polarization-orientation is established by a thin-film polarizer 24 located in the resonator. Q-switched pulsed operation of the resonator is effected cooperatively by a Pockels cell 26 and a quarter-waveplate 28 located in resonator 12.

The preferred end-pumping of the gain-element and Q-switch pulsed-operation are exemplary and should not be considered as limiting the present invention. Those skilled in the art would recognize that gain-element 18 may be side-pumped and that "cavity dumped" pulsed-operation may be utilized, without departing from the spirit and scope of the present invention.

A beam of output fundamental-radiation from resonator 12 is transmitted through OC mirror 16 and focused by a lens 30 into an optically nonlinear crystal 32, which is arranged for type-1 frequency-doubling of the fundamental radiation. A half-waveplate 34 rotates the polarization-orientation of the fundamental radiation directed into nonlinear crystal 32 by 90°. A portion of the fundamental radiation is converted by nonlinear crystal 32 into a beam of second-harmonic radiation, having a wavelength in the visible region of the electromagnetic spectrum, leaving a residual beam of fundamental radiation. For example, up to about 50% of the fundamental radiation is converted. Second-harmonic radiation is indicated in the drawing by double arrowheads 2H. The second harmonic-radiation has a polarization-orientation orthogonal to that of the fundamental radiation, indicated by arrows $P_{2H}$.

The second-harmonic radiation and the residual fundamental-radiation are both focused by a lens 36, through a selective waveplate 38, into an optically nonlinear crystal 40. Nonlinear crystal 40 is arranged for type-1 sum-frequency mixing of the second-harmonic radiation with the residual fundamental-radiation to generate a beam of third-harmonic radiation. Third-harmonic radiation is indicated in the drawing by triple arrowheads 3H. Suitable crystals for the second-harmonic generation and sum-frequency mixing include lithium triborate (LBO), beta barium borate (BBO), cesium borate (CB), and cesium lithium borate (CLBO). Frequency-tripling of the above-discussed wavelengths between 1020 nm and 1080 nm provides output wavelengths between about 340 nm and about 360 nm.

Selective waveplate 38 is configured to provide no polarization rotation of the fundamental radiation and 90-degrees polarization rotation of the second-harmonic radiation, thereby aligning the polarization orientations for type-1 sum-frequency mixing. The third-harmonic radiation has a polarization-orientation orthogonal to the orientation of the fundamental radiation and second-harmonic radiation, indicated by arrows $P_{3H}$. The polarization-orientation of the output third-harmonic radiation can be rotated by another half-waveplate (not shown), if required for an application. The output third-harmonic radiation is collimated by a lens 42, forming a collimated ultraviolet output beam 44. There is some remaining fundamental-radiation and remaining second-harmonic radiation (not shown) following the sum-frequency mixing. This remaining radiation can be separated from the output third-harmonic radiation by a filter (also not shown), such as a thin-film interference filter. Remaining radiation is preferably removed for most applications.

Figure 1B:
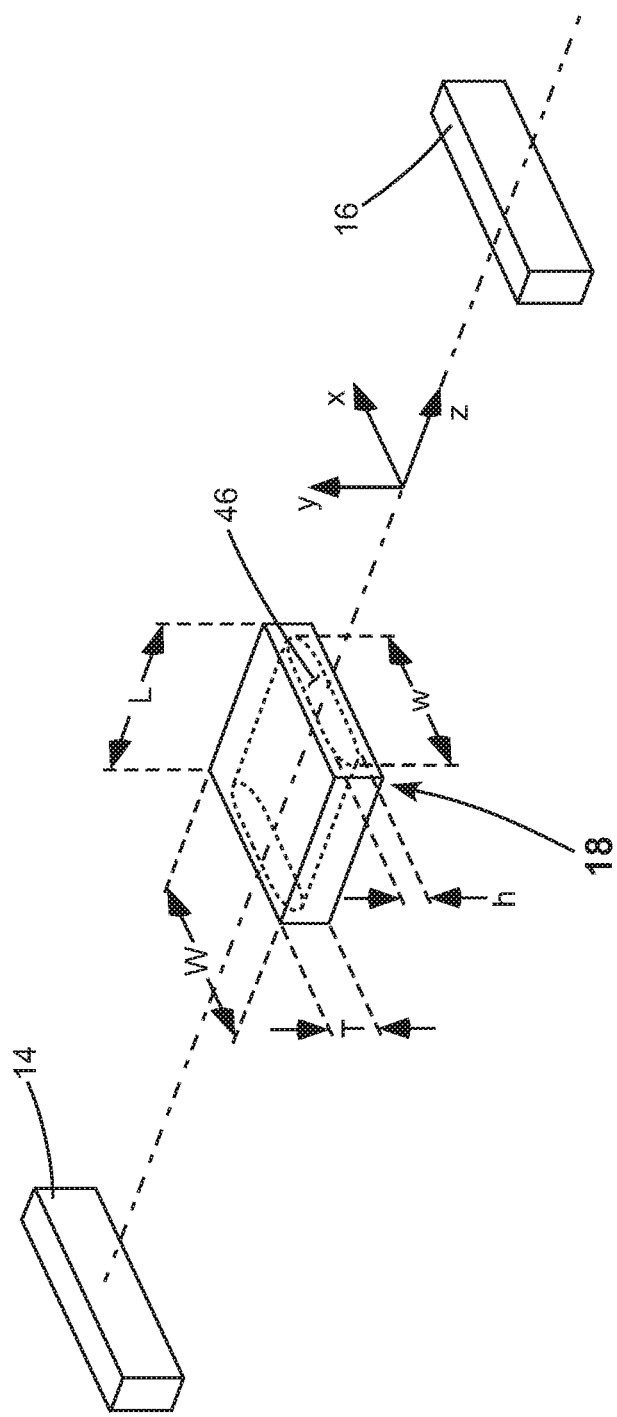
FIG. 1B is a perspective view schematically illustrating details of the gain-element and the two resonator mirrors in the laser of FIG. 1A.

The beam of output fundamental-radiation from resonator 12 and ultraviolet output beam 44 have a first transverse axis parallel to the x-axis, a second transverse axis parallel to the y-axis, and propagate along the z-axis, as depicted in FIGS. 1A and 1B. The transverse x-axis and transverse y-axis are mutually orthogonal. HR mirror 14 and OC mirror 16 may be flat or may be cylindrical having catoptric power only in the second transverse axis.

The first transverse axis is referred to hereinafter as the "horizontal axis" or "long axis". The second transverse axis is referred to hereinafter as the "vertical axis" or "short axis". The z-axis is referred to as the "propagation axis". Terms such as "horizontal", "vertical", "long", and "short" are used herein for convenience of description. "Horizontal" and "vertical" are not meant to limit the spatial orientation of the laser apparatus in use. Similarly, "long" and "short" are not meant to limit the aspect ratio of a beam, which is easily transformed by lenses and mirrors. Those skilled in the art would recognize that the short and long axes of the output beam could be interchanged using a periscope and that the beam-dimensions can be adjusted using one or more telescopes. These changes can be made without departing from the spirit and scope of the present invention.

Figure 1C:
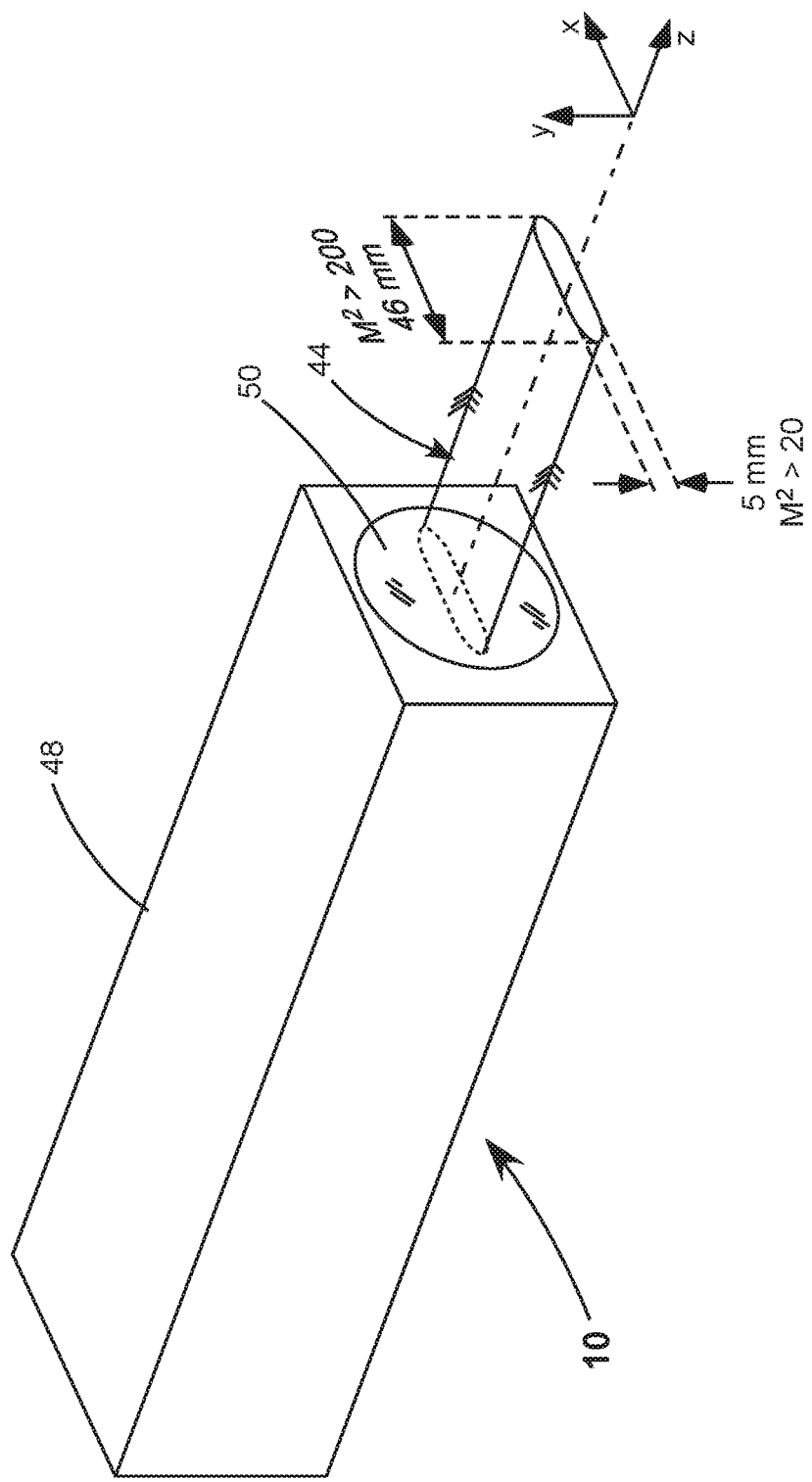
FIG. 1C is a perspective view schematically illustrating the laser of FIG. 1A in a housing having a window through which the ultraviolet output beam is delivered, with exemplary $M^2$ values and cross-sectional beam dimensions for the two transverse axes indicated.

FIG. 1C is a perspective view schematically illustrating the frequency-tripled pulsed solid-state laser of FIG. 1A in a housing 48 having a window 50, through which ultraviolet output beam 44 is delivered. Exemplary $M^2$ values and exemplary cross-sectional dimensions for the short and long axes of the ultraviolet output beam are indicated on the drawing. The exemplary $M^2$ values are respectively greater than 20 and greater than 200. The exemplary cross-sectional dimensions of ultraviolet output beam 44 are respectively about 5 mm and about 46 mm. Ultraviolet output beam 44 from inventive laser 10, having slab-shaped gain-element 18, may be rectangular or may be elliptical in cross-section. The cross-sectional shape depends, for example, on whether the gain-element is side-pumped or end-pumped.

Inventive laser 10 is capable of delivering ultraviolet output pulses having a full-width at half maximum (FWHM) pulse-duration greater than about 10 ns and a pulse-energy greater than about 100 mJ-per-pulse at a pulse-repetition frequency greater than about 100 Hz.

It should be noted here that the design of inventive laser 10 represent a radical departure from conventional solid-state laser design, in which efforts are directed to maximizing beam quality (minimizing $M^2$) for operations such as laser cutting and laser drilling. In these operations, precise focusing of laser radiation is required. Such conventional solid-state lasers typically deliver a laser beam with a nominally circular cross-section and an $M^2$ value less than about 1.5 in both transverse axes. Multimode solid-state lasers emitting ultraviolet radiation are also designed to have the lowest possible $M^2$ values for a given output power. Typically, these lasers produce ultraviolet output beams having $M^2$ values of less than 20 in both transverse axes.

An objective in designing inventive laser 10 is to maximize $M^2$ to reach values greater than about 20 in the short axis and greater than about 200 in the long axis, with the long-axis $M^2$ value greater than the short-axis $M^2$ value. These large beam-quality factors are characteristic of the above-discussed excimer lasers that the inventive laser is intended to replace. Key to maximizing $M^2$ values is slab-shaped gain-element 18, cooperative with the above-discussed cylindrical resonator mirrors 14 and 16. Gain-element 18 has a horizontal width W, a vertical thickness T, and a length L, as depicted in FIG. 1B.

The above-described end-pumping with elongated beams from two-dimensional diode-laser arrays 20A and 20B provides an elongated gain-volume, having a horizontal width w, a vertical height h, and a length L (the length of the gain-element). A cross-sectional gain-area 46 with dimensions width w by height h defines the cross-section of the beam of fundamental radiation within gain-element 18. Gain-area 46 acts as a soft aperture within resonator 12. Width w is significantly greater than height h, preferably at least three times greater. These representative dimensions are referred to below in describing calculated performance of examples of inventive laser 10.

Figure 2A:
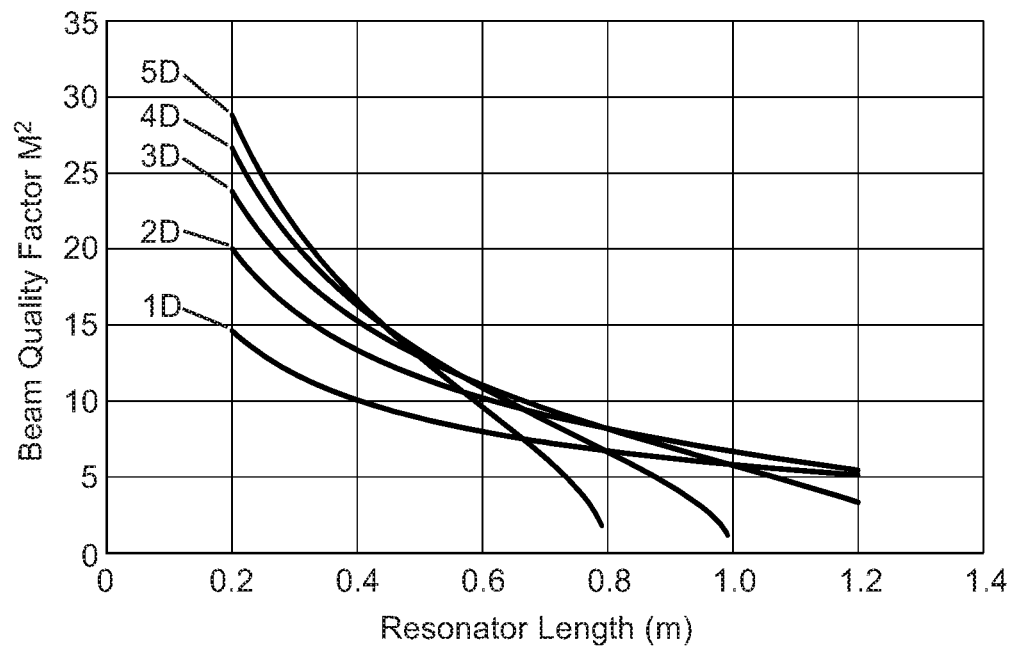
FIG. 2A is a graph schematically illustrating calculated $M^2$ values in the short axis for the near-infrared beam as a function of resonator length, for different thermal lenses in the gain-element, in an example of the laser of FIG. 1A having flat resonator mirrors.
Figure 2B:
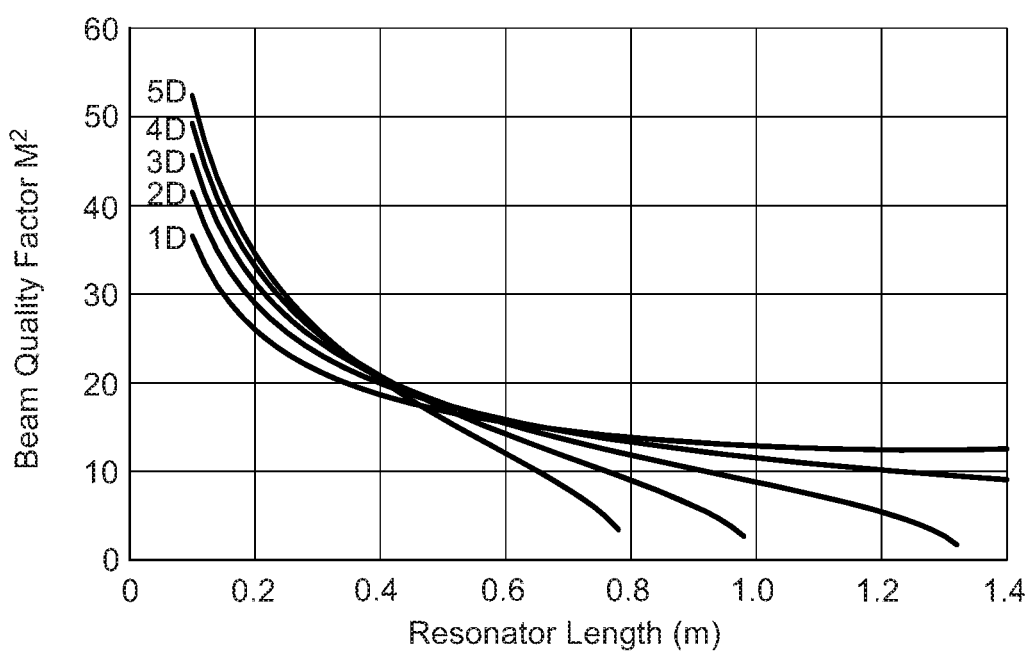
FIG. 2B is a graph schematically illustrating calculated $M^2$ values in the short axis for the near-infrared beam as a function of resonator length, for different thermal lenses in the gain-element, in an example of the laser of FIG. 1A having concave resonator mirrors.

FIGS. 2A and 2B graphically illustrate calculated beam-quality factor $M^2$ for the output fundamental radiation from resonator 12 in the vertical axis versus resonator length, in an example of inventive laser 10 of FIG. 1A. The resonator length is the distance between resonator mirrors 14 and 16. Resonator mirrors 14 and 16 are flat in the calculation of FIG. 2A. Resonator mirrors 14 and 16 are concave in the calculation of FIG. 2B, having a radius-of-curvature of 1 m. Gain-element 18 is located in the center of the resonator. $M^2$ values are depicted for different thermal lenses in the gain-element, from 1 diopter (D) to 5 D, in the vertical axis. In this example, fundamental radiation is generated having a wavelength of about 1064 nm. The dimensions width W, length L, and thickness T of gain-element 18 are assumed to be 50 mm, 50 mm, and 5.0 mm, respectively. Gain-area 46 has a width w of 40 mm and a height h of 3.0 mm.

Figure 2C:
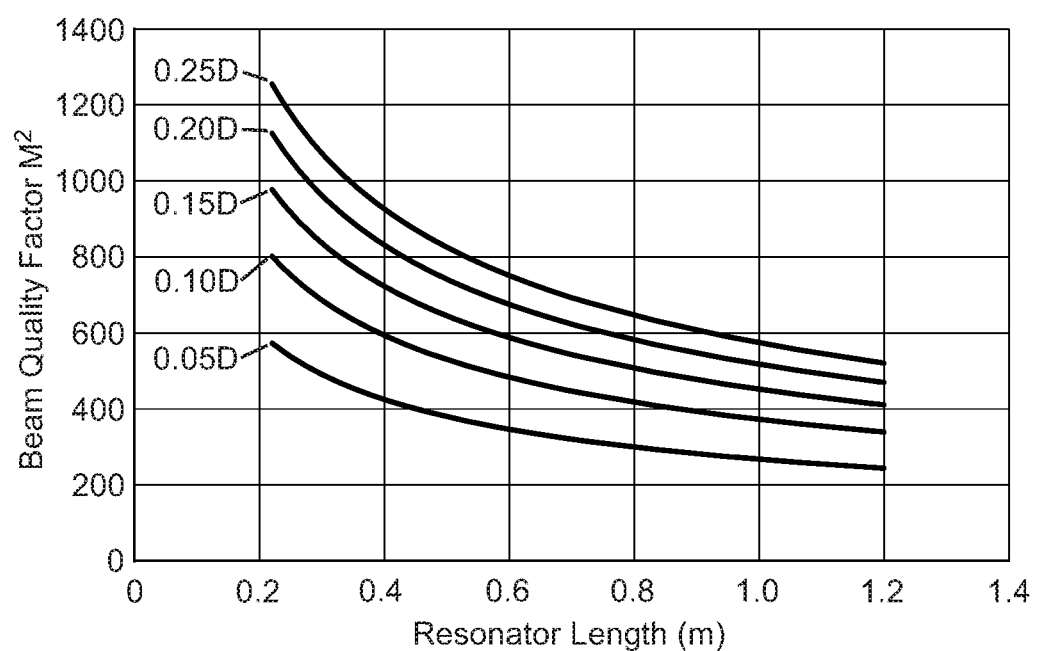
FIG. 2C is a graph schematically illustrating calculated $M^2$ values in the long axis for the near-infrared beam as a function of resonator length, for different thermal lenses in the gain-element, in the example of FIG. 2A.

FIG. 2C graphically illustrates calculated beam-quality factor $M^2$ for the output fundamental radiation in the horizontal axis versus resonator length, in the resonator of FIG. 2A, which has flat resonator mirrors. The thermal lens in gain-element 18 is approximately 0 D in the horizontal axis. However, intra-cavity focusing or defocusing can be introduced by adding cylindrical lenses having dioptric power in the horizontal axis. $M^2$ values are depicted for different pairs of cylindrical lenses, from 0.05 D to 0.25 D total dioptric power, that are symmetrically located adjacent to each end of the gain-element. Adding positive dioptric power to the resonator increases the $M^2$ values in the horizontal axis.

Figure 3:
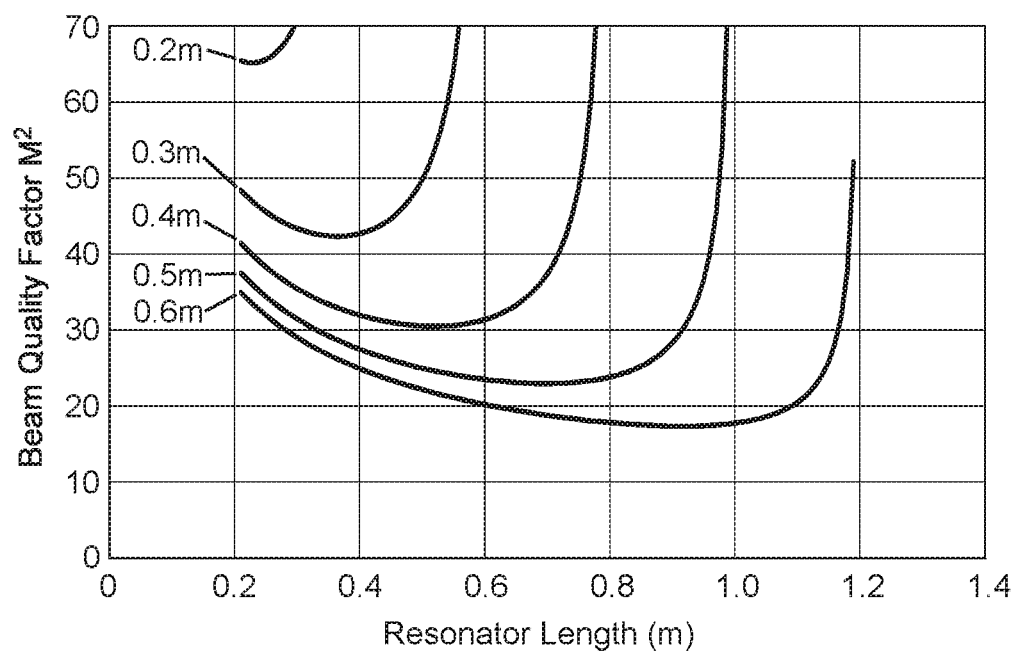
FIG. 3 is a graph schematically illustrating calculated $M^2$ values in the short axis for the near-infrared beam as a function of resonator length, for different resonator mirror curvatures, in the example of FIG. 2A.

FIG. 3 graphically illustrates calculated beam-quality factor $M^2$ for the output fundamental radiation in the vertical axis versus resonator length, in the resonator of FIG. 2A. Here, the thermal lens in gain-element 18 is 2.75 D in the vertical axis. $M^2$ values are depicted for different radii-of-curvature of the resonator mirrors, from 0.2 m to 0.6 m, in the vertical axis. FIG. 2A shows that adding positive dioptric power to the resonator increases the $M^2$ values in the vertical axis. Similarly, FIG. 3 shows that adding positive catoptric power to the resonator considerably increase the accessible $M^2$ values in the vertical axis.

The examples demonstrate that a lasing resonator-mode is established having beam-quality factors that are determined by the resonator length, gain-area, intra-cavity lensing, and curvature of the resonator mirrors. Thermal-lensing is strongest in the vertical axis and negligible in the horizontal axis. The resulting $M^2$ values are still smaller in the vertical axis than in the horizontal axis due to the slab-shape of gain-element 18 and the elongation of gain-area 46. Dioptric or catoptric power in each of the transverse axes can be modified independently using intra-cavity lenses or curved resonator mirrors to achieve desired $M^2$ values for the output fundamental radiation. Again, in the exemplary laser, the vertical axis corresponds to the short axis and the horizontal axis to the long axis of the fundamental radiation.

It is further assumed that gain-element 18 is a $Nd^{3+}$ doped YAG crystal. If the gain-element is energized by 4.8 J-per-pulse of absorbed pump-radiation, the dioptric power of the slab-shaped gain-element is about 4.75 D in the short axis and about 0 D in the long axis. Under these conditions, resonator 12 can be configured to reliably produce $M^2$ values for the output fundamental radiation greater than 10 in the short axis and greater than 50 in the long axis. Preferably, resonator 12 would be configured to produce $M^2$ values greater than 20 in the short axis and greater than 200 in the long axis.

Figure 4:
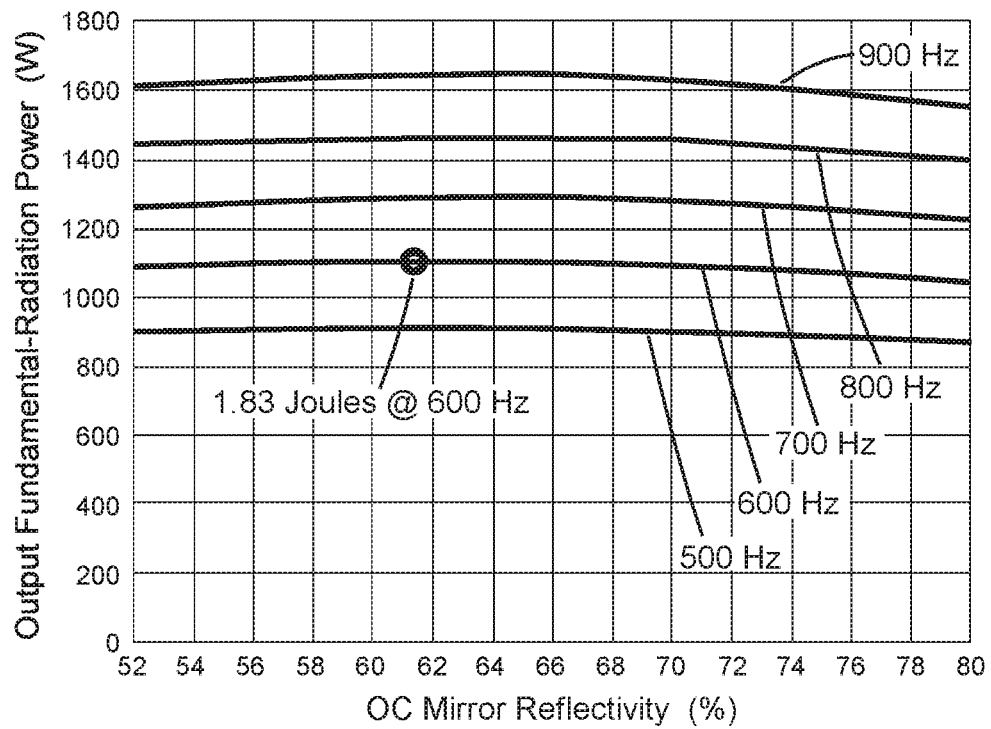
FIG. 4 is a graph schematically illustrating calculated near-infrared output power as a function of output-coupling resonator mirror reflectivity, for different pulse-repetition frequencies, in the example of FIG. 2A.
Figure 5:
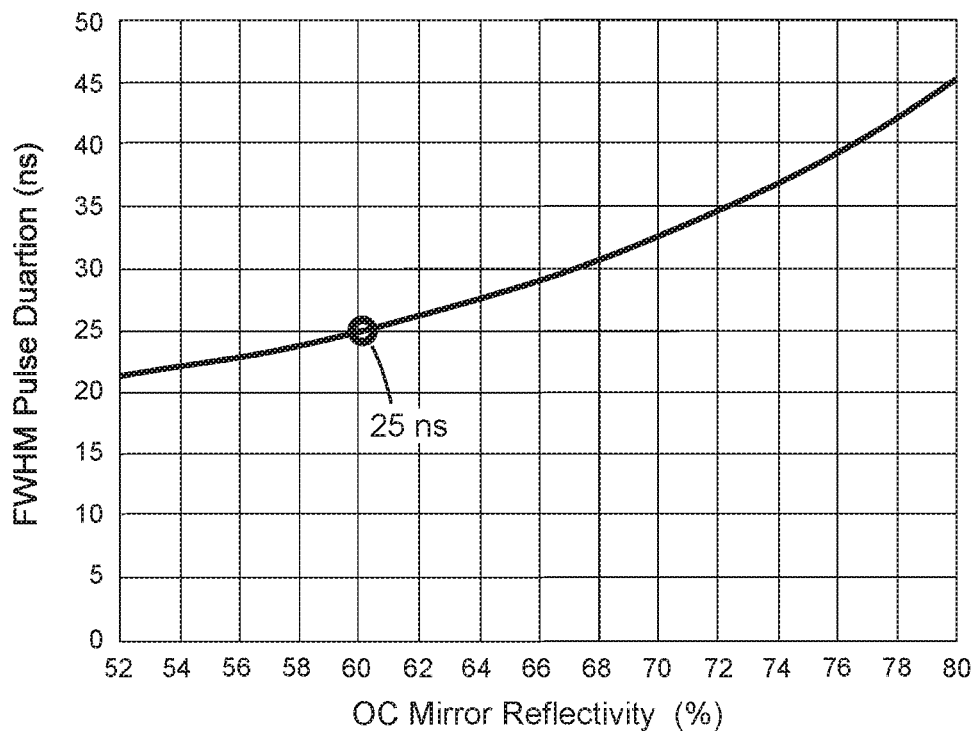
FIG. 5 is a graph schematically illustrating FWHM pulse-duration as a function of output-coupling resonator mirror reflectivity in the example of FIG. 4.

FIG. 4 is a graph of calculated output fundamental-radiation power as a function of OC-mirror reflectivity, with the exemplary $Nd^{3+}$:YAG resonator operated at different pulse-repetition frequencies, from 500 Hz to 900 Hz. Here, the resonator length is 1 m and the resonator mirrors are flat. The other resonator parameters are the same as for FIG. 2A. It can be seen that at a pulse-repetition frequency of 600 Hz and for an OC-mirror reflectivity of about 60%, the output fundamental-radiation power peaks at about 1,100 W, which corresponds to a pulse-energy of about 1.86 Joules. In examples presented herein below it is assumed that the resonator is pumped at and operates at a pulse-repetition frequency of 600 Hz. FIG. 5 is a graph of FWHM pulse-duration as a function of OC-mirror reflectivity in the example of FIG. 4. It can be seen that the optimal 60% OC-mirror reflectivity results in a pulse-duration of about 25 ns.

Model calculations indicate that the output third-harmonic radiation power from inventive laser 10 can be expected to be about 32% of the output fundamental-radiation power from resonator 12, when the harmonic-conversion efficiencies are optimized. Accordingly, the inventive frequency-tripled solid-state laser can be expected to deliver an ultraviolet output power of about 350 W at a wavelength of 355 nm. Higher powers may be achieved through further refinement of the inventive near-infrared resonator. At this ultraviolet output power, the combined outputs of about twelve of the inventive lasers would be required to provide the same power produced by six excimer lasers.

Figure 6:
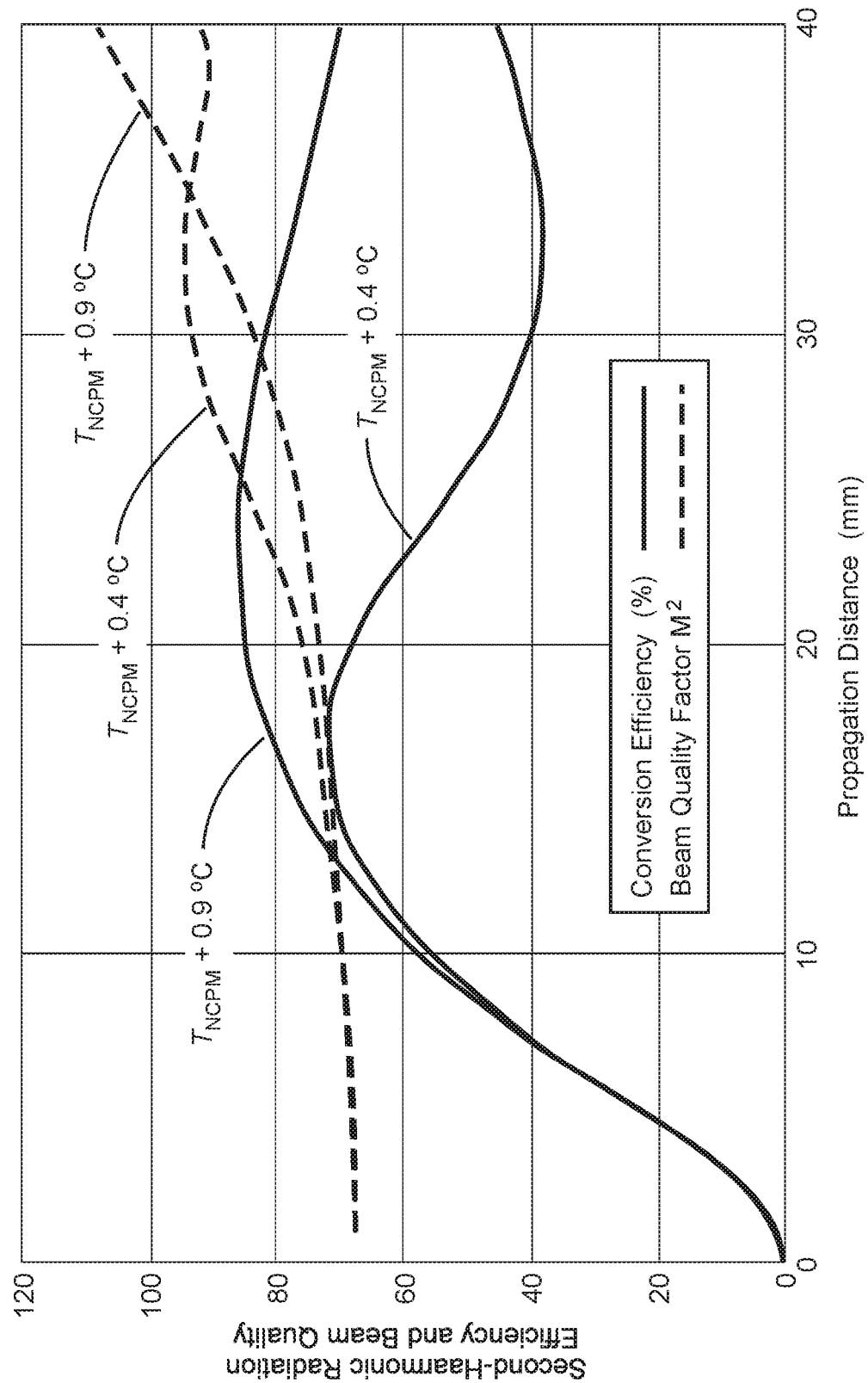
FIG. 6 is a graph schematically illustrating calculated $M^2$ values in the long axis for a visible beam produced by second-harmonic generation and calculated percentage second-harmonic conversion efficiency in a type-1 non-critically phase-matched LBO crystal as a function of propagation distance in the LBO crystal, for two different LBO crystal temperatures.

FIG. 6 graphically illustrates calculated second-harmonic generation efficiency as a function of propagation distance a type-1 non-critically phase-matched LBO crystal. The conversion efficiency is expressed as a percentage. The beam waist of the fundamental radiation is located in the center of the LBO crystal. The cross-sectional dimensions of the beam waist are assumed to be 1 mm in the short axis and 10 mm in the long axis. Incident pulse energy is assumed to be 0.375 J and pulse duration is assumed to be 25 ns. $T_{NCPM}$ is the non-critical phase-matching temperature for a plane wave, which is typically calculated to be in a range between about 150° C. and about 160° C. The precise temperature depends on the Sellmeier coefficients used in the calculation. Calculations are shown for two crystal temperatures, $T_{NCPM}$+0.4° C. and $T_{NCPM}$+0.9° C. The optimum crystal temperature for the focused beams in the example is about $T_{NCPM}$+0.9° C. This slight detuning from $T_{NCPM}$ partially compensates wave-front curvature of the fundamental radiation on both sides of the beam waist.

It was determined that the already high $M^2$ value of the output fundamental-radiation from resonator 12 can be significantly increased by nonlinear crystal 32. Second-harmonic radiation is generated from the output fundamental-radiation by second-harmonic generation in the nonlinear crystal. FIG. 6 also illustrates calculated second-harmonic radiation beam-quality factor $M^2$ in the long axis as a function of propagation distance within the crystal. It is assumed that the incident beam of multimode fundamental-radiation has a wavelength of 1064 nm, an $M^2$ value of 10 in the short axis, and an $M^2$ value of 50 in the long axis. The calculations show that the $M^2$ value in the long axis more than doubles, from 50 for the incident beam of fundamental radiation to 108 for the beam of second-harmonic radiation emerging from the LBO crystal, at the optimum crystal temperature. Even for short propagation distances of a few millimeters within the LBO crystal, the $M^2$ value increases to about 67 for the beam of second-harmonic radiation.

Figure 7:
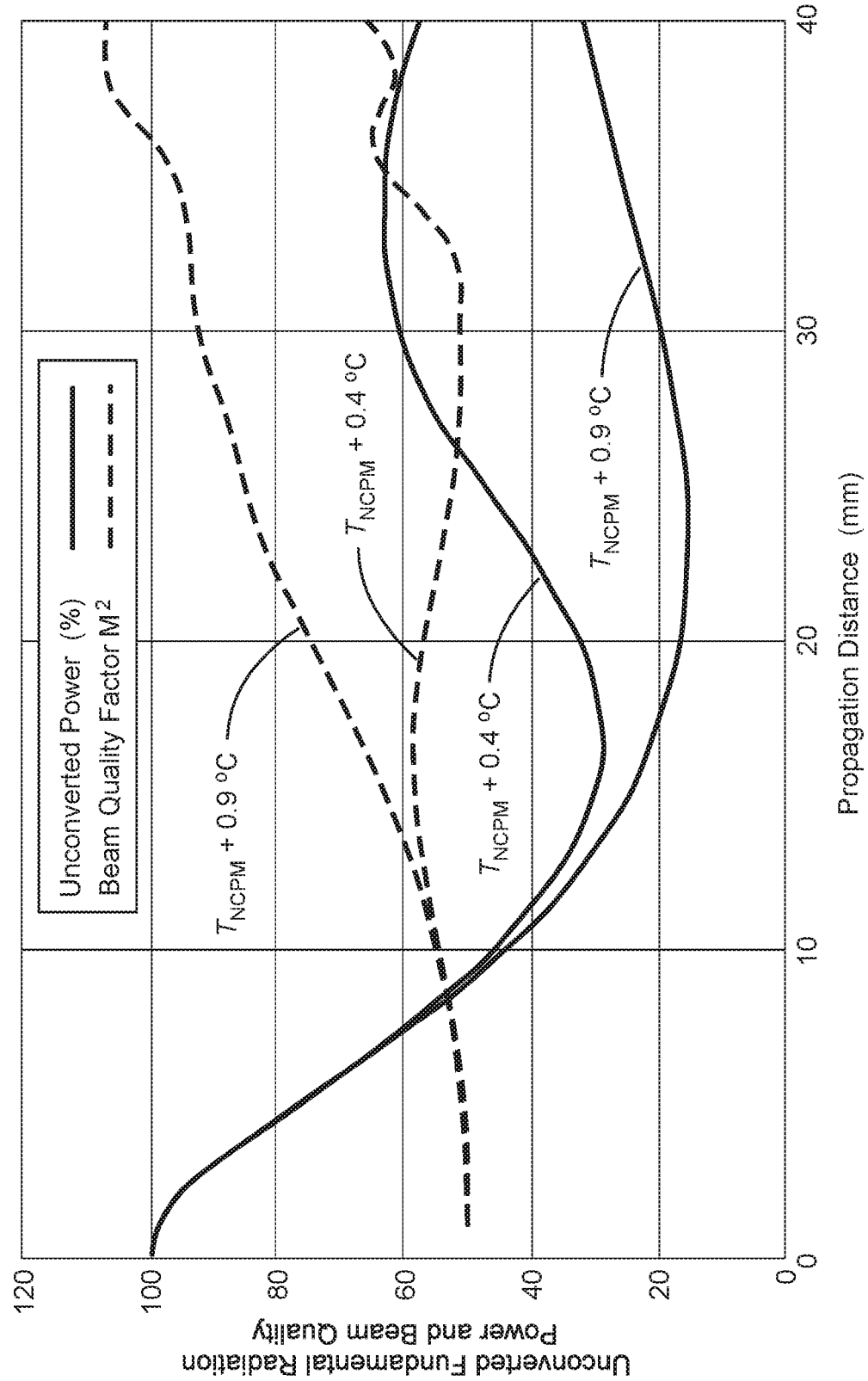
FIG. 7 is a graph schematically illustrating calculated $M^2$ values in the long axis for the near-infrared beam and calculated percentage of unconverted power in the near-infrared beam as a function of propagation distance in the LBO crystal of FIG. 6, for two different crystal temperatures.

FIG. 7 is a graph of calculated beam-quality factor $M^2$ in the long axis for unconverted fundamental-radiation as a function of propagation distance in the non-critically phase-matched LBO crystal of FIG. 6. FIG. 7 also illustrates calculated unconverted fundamental-radiation power as a function of propagation-distance within the LBO crystal. The unconverted power is expressed as a percentage of the incident fundamental-radiation power on the LBO crystal. Unconverted fundamental-radiation exiting the LBO crystal becomes the residual fundamental-radiation directed into nonlinear crystal 40. Calculations are shown for the same crystal temperatures as FIG. 6. The $M^2$ value of the unconverted fundamental-radiation in the long axis also increases at the optimum crystal temperature, more than doubling to a maximum of about 106 as the beam propagates through nonlinear crystal 32. Accordingly, nonlinear crystal 40 generates third-harmonic radiation by sum-frequency mixing the beam of residual fundamental-radiation and the beam of second-harmonic radiation, each having a $M^2$ value of more than 100 in the long axis.

FIGS. 6 and 7 illustrate increases in the beam-quality factors $M^2$ of the generated second-harmonic beam and the residual fundamental beam that are beneficial for laser annealing. These increases arise from changes in wave-front curvature of the propagating beams coupled with the conversion of fundamental radiation to second harmonic radiation and back-conversion of second-harmonic radiation to fundamental radiation. In general, frequency doubling is most efficient when the fundamental beam and the second-harmonic beam have the same wave-front curvature. For multimode beams with a flat-top intensity distribution, precise matching of the wave-front curvatures occurs when the $M^2$ value of the second-harmonic beam is twice the $M^2$ value of the fundamental beam. Variations in the $M^2$ values as the beams propagate through the nonlinear crystal are produced by continuous conversion and back conversion between the various transverse modes.

Figure 8A:
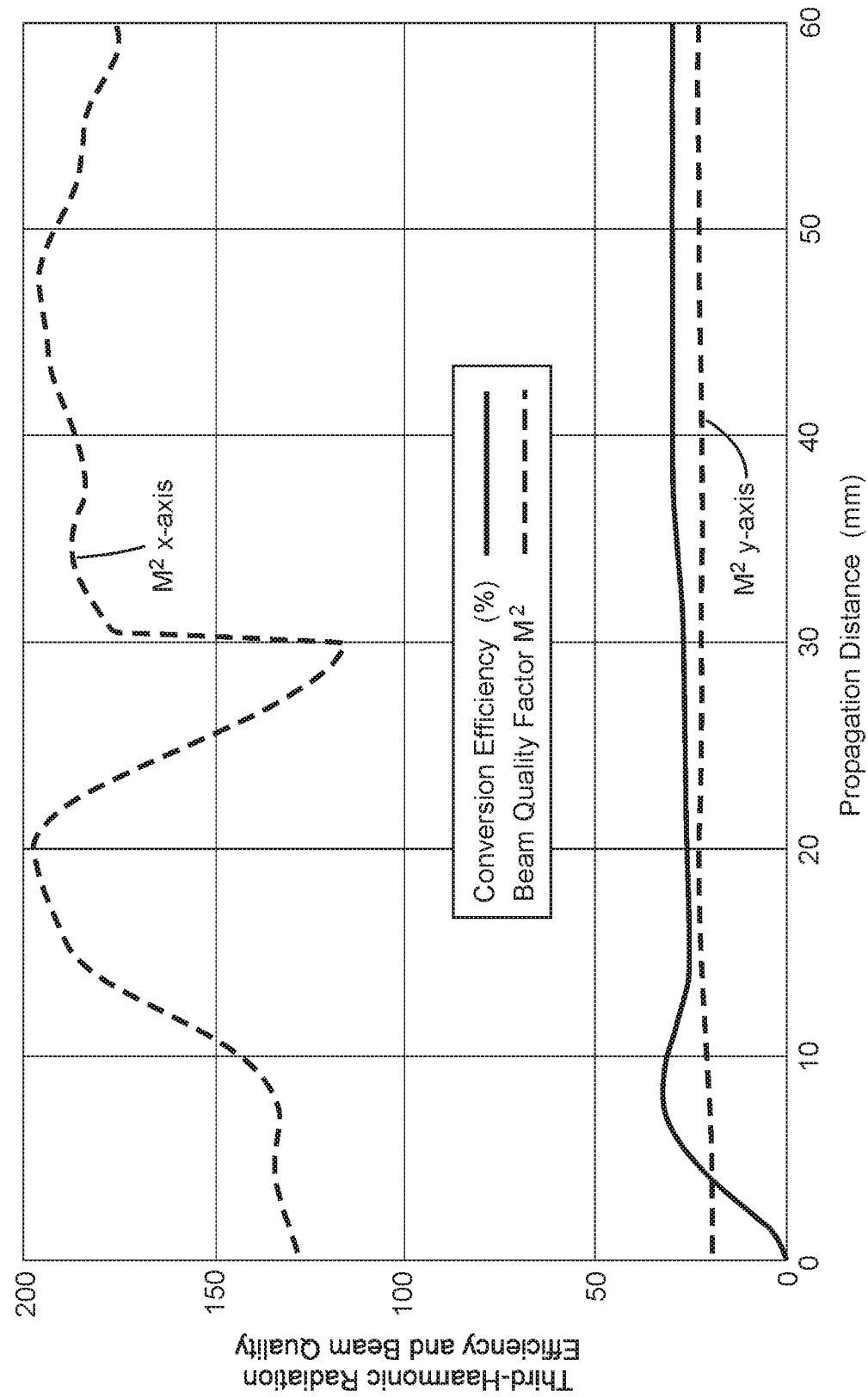
FIG. 8A is a graph schematically illustrating calculated $M^2$ values in the two transverse axes for the ultraviolet output beam produced by sum-frequency mixing in two LBO crystals and calculated percentage conversion efficiency as a function of propagation distance in the two LBO crystals, at a temperature of 90° C.
Figure 8B:
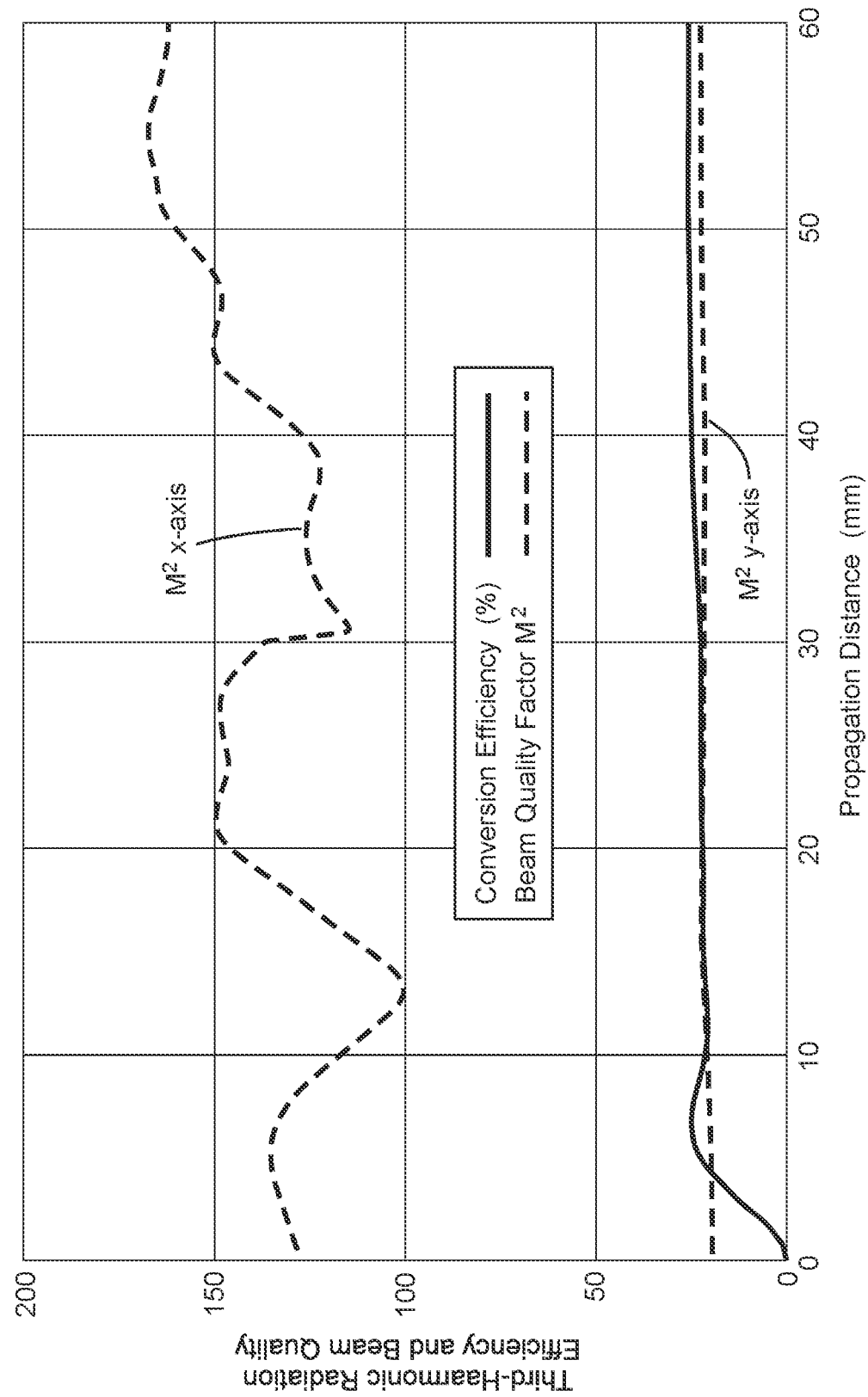
FIG. 8B is a graph schematically illustrating calculated $M^2$ values in the two transverse axes for the ultraviolet output beam produced by sum-frequency mixing in two LBO crystals and calculated percentage conversion efficiency as a function of propagation distance in the two LBO crystals, at a temperature of 100° C.

FIGS. 8A and 8B graphically illustrate calculated beam quality factor $M^2$ for third-harmonic radiation as a function of propagation distance through nonlinear crystal 40, which has the form of two separate LBO crystals, each having a length of 30 mm. The two LBO crystals are configured and arranged for walk-off compensation. FIG. 8A has a temperature in each crystal of 90° C. and FIG. 8B has a temperature in each crystal of 100° C. FIGS. 8A and 8B also illustrate calculated third-harmonic conversion efficiency as a function of propagation distance within the two LBO crystals. Again, the overall conversion of fundamental radiation to third-harmonic radiation is most efficient when the wave-front curvatures of all the beams are matched. Precise matching occurs when the $M^2$ value of the third-harmonic beam is three times that of the fundamental beam and the $M^2$ value of the second-harmonic beam is two times that of the fundamental beam.

It is assumed that the incident beam of residual fundamental radiation directed into the first LBO crystal has an $M^2$ value of 10.5 in the short axis and 106 in the long axis. The incident beam of second harmonic-radiation directed into the first LBO crystal has an $M^2$ value of 17 in the short axis and 92 in the long axis. The cross-sectional dimensions of the beam waist in the center of each LBO crystal are assumed to be 0.5 mm in the short axis and 10 mm in the long axis. The incident pulse energies are assumed to be 0.206 J of residual fundamental-radiation and 0.169 J of second-harmonic radiation. That is, a ratio of 55% to 45% for pulse energy in the fundamental radiation to pulse energy in the second-harmonic radiation. The pulse duration is still assumed to be 25 ns.

It was determined that the $M^2$ value of the output third-harmonic radiation further increased to 22 in the short axis and 176 in the long axis after propagation through both LBO crystals at 90° C. That is, the $M^2$ value in the long axis is greater than 1.5-times the $M^2$ values of the incident second-harmonic radiation and residual fundamental radiation. The overall conversion efficiency is 30%. To summarize results of the model calculations, output fundamental-radiation from the resonator having $M^2$ values of 10 and 50 is converted into output third-harmonic radiation having $M^2$ values of about 22 and 176, respectively. 0.375 J-per-pulse of fundamental radiation is converted into about 0.113 J-per-pulse of third-harmonic radiation.

The model calculations indicate that, following second-harmonic generation in nonlinear crystal 32, fundamental radiation $M^2$ values of between about 15 and 25 in the short axis and between about 150 and 200 in the long axis can increase to between about 30 and 50 in the in the short axis and between about 300 and 400 in the long axis. That is, the beam-quality factor about doubles in value in each axis. Following sum-frequency mixing in nonlinear crystal 40, the third-harmonic radiation $M^2$ values can further increase to between about 45 and 65 in the short axis and between about 450 and 600 in the long axis. Ultimately, the $M^2$ value in the long axis following sum-frequency mixing may be constrained by angular-acceptance limitations of the nonlinear crystals. Nevertheless, the $M^2$ values of the output third-harmonic beam can be greater than about 60 in the short axis and greater than about 400 in the long axis. This compares with $M^2$ values of 80 in the short axis and 500 in the long axis for ultraviolet beams produced by excimer lasers currently used for laser annealing, which are discussed above.

Figure 9A:
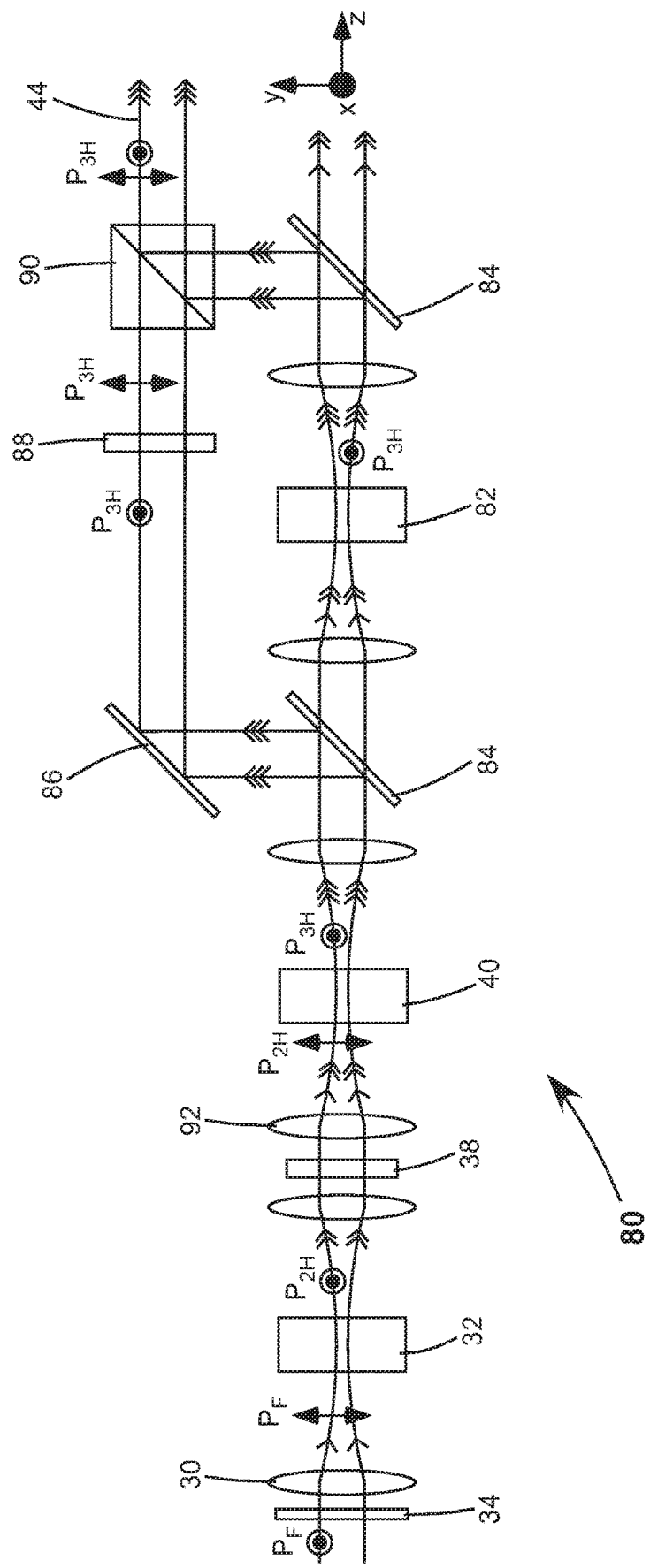
FIGS. 9A and 9B schematically illustrate preferred embodiments of externally-frequency-tripled repetitively-pulsed solid-state lasers in accordance with the present invention, similar to the laser of FIG. 1, but the near-infrared and visible beams converted into an ultraviolet beam by two nonlinear crystals.

FIGS. 8A and 8B demonstrate that having multiple non-linear crystals arranged in series to generate third-harmonic radiation can provide sufficient propagation distance to achieve a desired beam-quality factor. FIG. 9A schematically illustrates another preferred embodiment 80 of an externally-frequency-tripled repetitively-pulsed solid-state laser in accordance with the present invention. Laser 80 is similar to laser 10 of FIG. 1, but has two nonlinear crystals 40 and 82 to generate third-harmonic radiation by sum-frequency mixing. Nonlinear crystals 40 and 82 may have the same length or may have different lengths, which are selected to optimize overall conversion of fundamental radiation to third-harmonic radiation and to provide a desired beam-quality factor. The optical elements of embodiment 80 to the left of waveplate 34 are the same as in the FIG. 1 embodiment, and are omitted for convenience of illustration.

A portion of the output fundamental radiation is converted by nonlinear crystal 32 into a beam of second-harmonic radiation. The second-harmonic radiation and the residual fundamental-radiation are both focused by a lens 92 into nonlinear crystal 40 to generate one beam of third-harmonic radiation by sum-frequency mixing. This third-harmonic beam is separated from the residual fundamental beam and residual second-harmonic beam by a mirror 84 and is directed by a mirror 86 through a half-waveplate 88 and onto a cube-prism polarizer 90. Mirror 84 is transmissive for fundamental radiation and second-harmonic radiation. Mirrors 84 and 86 are reflective for third-harmonic radiation.

The copropagating residual fundamental beam and residual second-harmonic beam transmitted through mirror 84 are focused into nonlinear crystal 82 to generate another beam of third-harmonic radiation. This third-harmonic beam is separated from the remaining fundamental beam and the remaining second-harmonic beam by another mirror 84 and directed thereby onto polarizer 90. The two beams of third-harmonic radiation incident on polarizer 90 have orthogonal linear polarizations and are combined thereby to form output beam of ultraviolet radiation 44. Polarizer 90 has a polarization selective surface that is transmissive for one polarization and reflective for the orthogonal polarization. Ultraviolet output beam 44 therefore includes both linear polarizations. The various lenses focus the beams into the nonlinear crystals and collimate the beams as depicted. For example, lens 92.

Figure 9B:
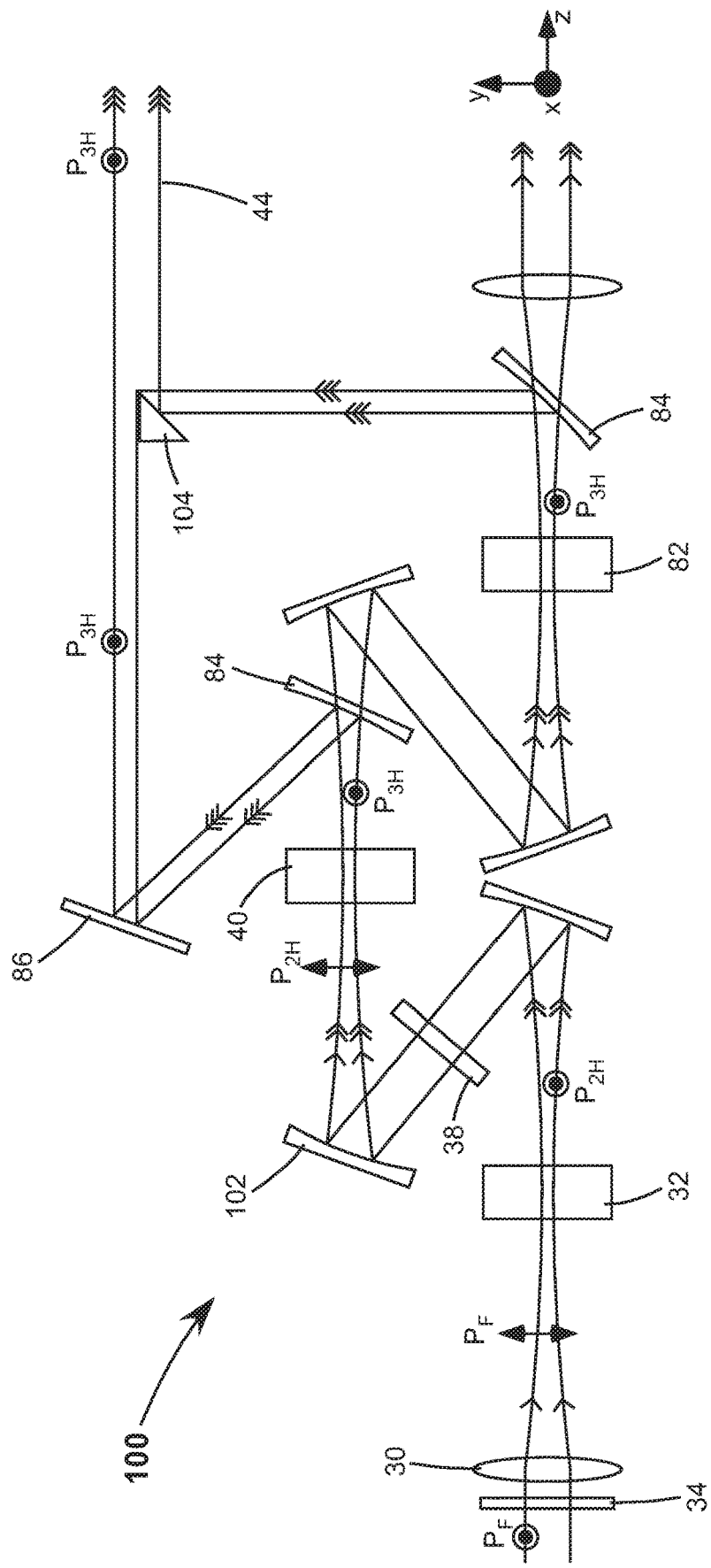

FIG. 9B schematically illustrates yet another preferred embodiment 100 of an externally-frequency-tripled repetitively-pulsed solid-state laser in accordance with the present invention. Laser 100 is similar to laser 80, but uses predominantly mirrors instead of lenses to focus and collimate the beams. For example, a mirror 102 in laser 100 instead of lens 92 in laser 80. Again, two third-harmonic beams are generated in separate nonlinear crystals. In laser 100, these third-harmonic beams are spatially combined by a mirror 104 that is reflective for third-harmonic radiation to form ultraviolet output beam 44. One advantage of laser 100 is that ultraviolet output beam 44 is linearly polarized.

To demonstrate principles of the present invention described herein above, two externally-frequency-tripled repetitively-pulsed solid-state lasers similar to embodiment 80 of FIG. 9A were modeled. Each laser has a resonator that produces a beam of output fundamental-radiation at 1064 nm having dimensions 2 mm×40 mm and beam quality factors 25×100 in the short×long axes. One non-linear crystal made of LBO generates a beam of second-harmonic radiation at 532 nm by type-I frequency doubling. Two serially-arranged non-linear crystals made of LBO generate two beams of third-harmonic radiation by type-I sum-frequency mixing. These two beams of third-harmonic radiation are collimated and polarization combined to form an output beam of unpolarized ultraviolet radiation, as depicted in FIG. 9A. The polarization-combined output beam of each laser has dimensions of 5 mm×40 mm and beam quality factors of 70×225 in the short×long axes.

Figure 10:
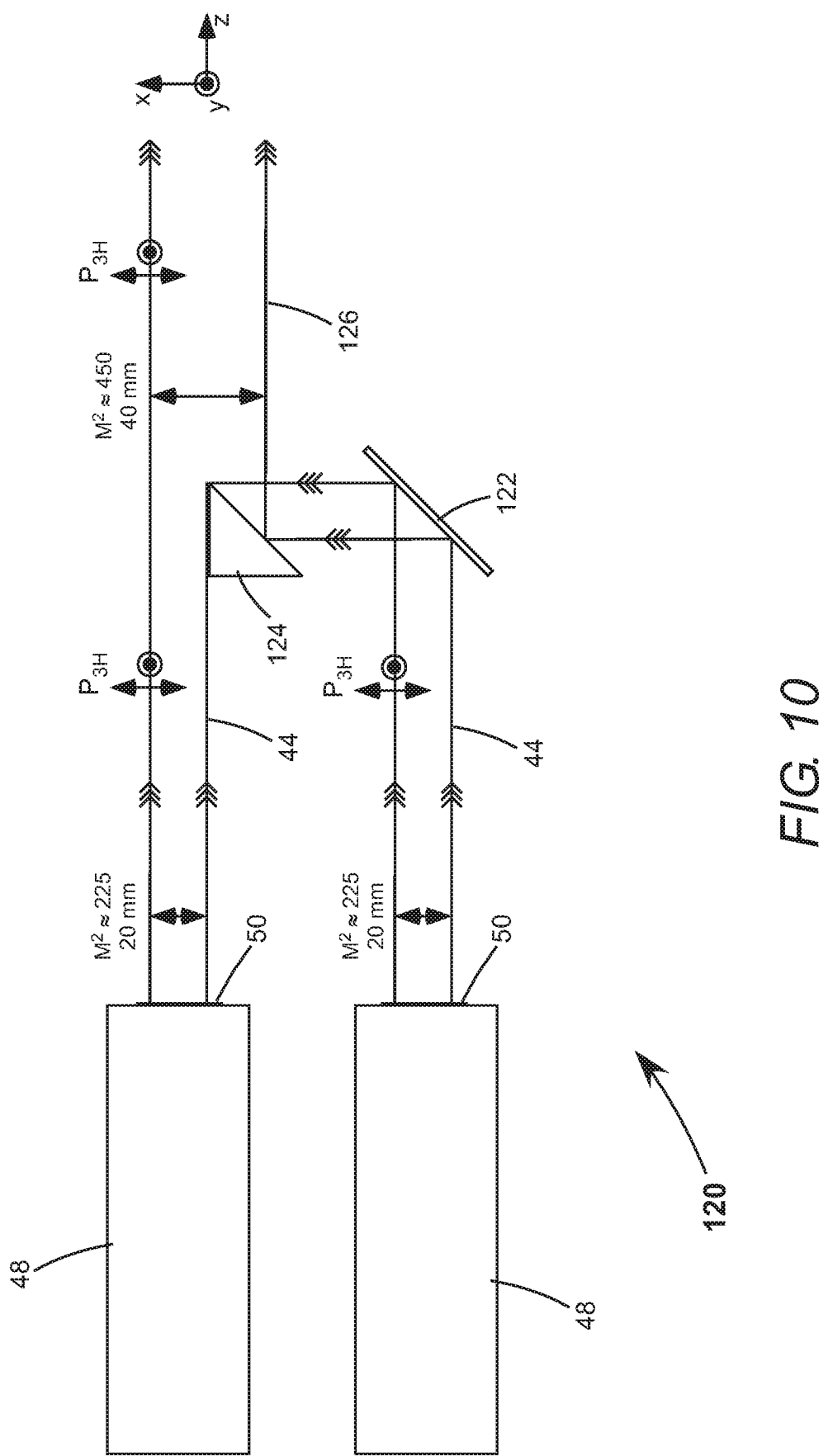
FIG. 10 schematically illustrates a preferred embodiment in accordance with the present invention having two externally-frequency-tripled repetitively-pulsed solid-state lasers, each similar to the laser of FIG. 9A, providing two unpolarized ultraviolet output beams that are spatially combined.

FIG. 10 schematically illustrates a preferred embodiment 120 in accordance with the present invention to spatially combine the output beams of the two externally-frequency-tripled repetitively-pulsed solid-state lasers. Each laser has housing 48 and window 50, through which output beam 44 is delivered. One of the output beams is directed by a mirror 122 onto a mirror 124 that is precisely located to spatially combine the two output beams into one combined beam of unpolarized ultraviolet radiation 126. Combined beam 126 has dimensions of about 5 mm×80 mm and beam quality factors of about 70×450 in the short×long axes. Combined beam 126 also has twice the power of each output beam 44.

Figure 11:
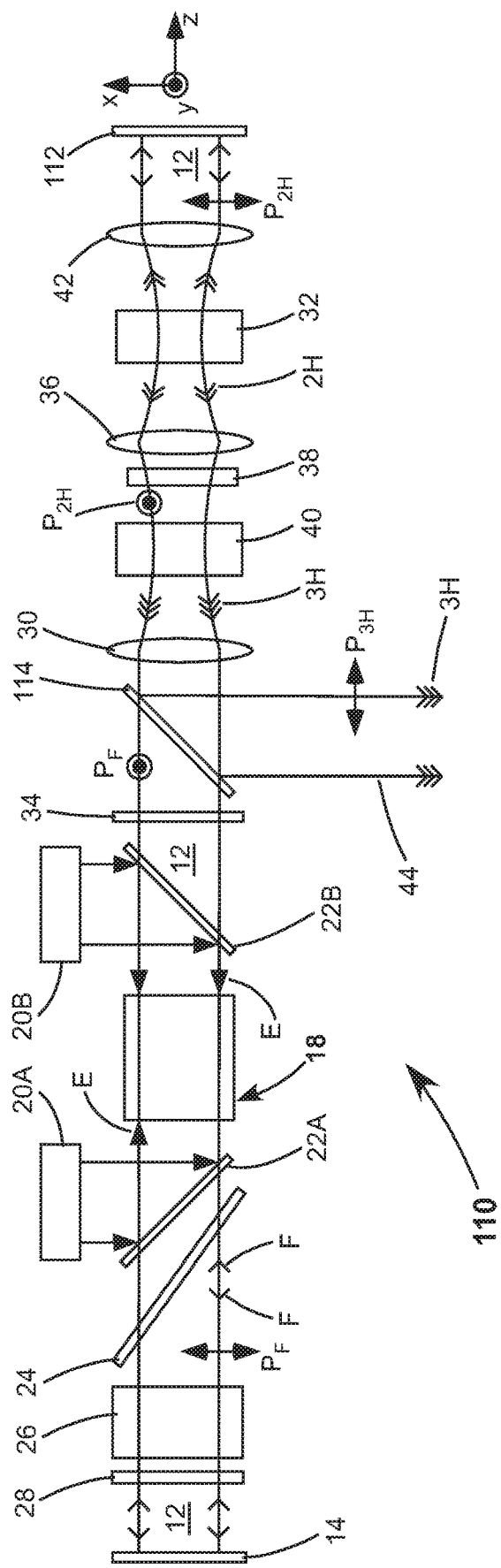
FIG. 11 schematically illustrates a preferred embodiment of an internally-frequency-tripled repetitively-pulsed solid-state laser in accordance with the present invention.

FIG. 11 schematically illustrates a preferred embodiment 110 of an internally-frequency-tripled repetitively-pulsed solid-state laser in accordance with the present invention. Laser 110 is similar to laser 10, having resonator 12 formed between HR mirror 14 and another high-reflection resonator mirror 112, which is highly reflective for both the fundamental radiation and the second-harmonic radiation. In laser 110, nonlinear crystals 32 and 40 are located within resonator 12. The beam of fundamental radiation circulates in resonator 12. Output coupling is through partial conversion of fundamental radiation to harmonic radiation, rather than partial transmission of fundamental radiation through an output-coupling mirror.

While propagating from left to right in the drawing, the beam of intracavity fundamental radiation passes through half-waveplate 34, nonlinear crystal 40, nonlinear crystal 32, and is reflected by an HR mirror 112. Half-waveplate 34 rotates the polarization-orientation of the fundamental radiation, then nonlinear crystal 32 partially converts the fundamental radiation to a beam of second-harmonic radiation, which is also reflected by HR mirror 112. The reflected fundamental radiation and second-harmonic radiation co-propagate from right to left through nonlinear crystal 32, selective waveplate 38, nonlinear crystal 40, and onto an output mirror 114. The reflected fundamental radiation is further converted into second-harmonic radiation by non-linear crystal 32, increasing the power of the beam of second-harmonic radiation. Selective waveplate 38 rotates the polarization of the second-harmonic radiation only. Nonlinear crystal 40 partially converts the fundamental radiation and the second-harmonic radiation to a beam of third-harmonic radiation. Output mirror 114 is highly transmissive for fundamental radiation and reflective for second-harmonic and third-harmonic radiation. Collimated ultraviolet output beam 44 is directed out of resonator 12 by output mirror 114. The polarization of the output third-harmonic radiation is indicated by arrow $P_{3H}$. The three lenses focus the beams into the nonlinear crystals and collimate the beams as depicted.

FIG. 12A, FIG. 12B, and FIG. 12C schematically illustrate a preferred embodiment 60 of a line-projector for combining and homogenizing the output of six frequency-tripled solid-state lasers of FIG. 1A. Line-projector 60 forms the combined output into a line-beam that is projected onto a silicon layer 62 to be annealed, which is supported on a substrate 64. The distribution of polarization orientations in the projected line-beam is selectable.

The six lasers are designated as lasers $10_A$, $10_B$, $10_C$, $10_D$, $10_E$, and $10_F$. The six lasers are assumed to have nominally the same output characteristics. The ultraviolet radiation emitted by each of the lasers is linearly-polarized, here, S-polarized. Each laser directs a beam of radiation through one of six corresponding polarization rotators 66. In the example depicted, the polarization rotators are adjusted such that radiation from lasers $10_A$ and $10_F$ is not polarization rotated and remains S-polarized. Radiation from lasers $10_C$ and $10_D$ is polarization rotated by 90° and becomes P-polarized. Radiation from lasers $10_B$ and $10_E$ is polarization rotated by some angle between 0° and 90°, to an intermediate orientation (I-polarized) between the P and S polarizations. For example, rotated by an angle of 45°.

The beams of radiation having various polarization orientations then traverse corresponding ones of six long-axis beam-homogenizers, each thereof including two cylindrical lens-arrays 68A and 68B. Output from all of the beam-homogenizers is collected by a spherical lens 70. Spherical lens 70 cooperative with a cylindrical lens 72, a spherical lens 74 and a cylindrical lens 76 combines the outputs of lasers $10_{A-F}$ into a line-beam on substrate 64. Spherical lenses 70 and 74 determine the length LL of the line-beam. Lenses 70, 72, 74 and 76 define the width LW of the line-beam, which is depicted in FIG. 12C. Each of the lasers delivers radiation to the entire length of the homogenized line-beam illuminating silicon layer 62. The line-projector of FIG. 12A is capable of combining and homogenizing beams from a plurality of lasers 10, here six, and forming a line-beam having a width LW of less than about 1.0 mm.

FIG. 12B schematically illustrates how the polarization of radiation at any point on the length of the line-beam is angularly distributed. In the example depicted, the polarization-orientation transforms from S-polarized at highest angles-of-incidence, through I polarized, to P-polarized at near normal angles-of-incidence.

It should be noted that only sufficient detail of line-projector 60 is presented here for understanding principles of the present invention. A detailed description of a particular apparatus for polarizing, combining, homogenizing, and projecting outputs from a plurality of ultraviolet excimer lasers is provided in U.S. Patent Application Publication No. 2016/0259174, assigned to the assignee of the present invention, the complete disclosure of which is hereby incorporated by reference. Those skilled in the art may use other beam combining and projecting apparatus without departing from the spirit and scope of the present invention.

In summary, described above is an inventive frequency-tripled solid-state laser producing an ultraviolet output beam having an average power, pulse energy, and beam-parameters comparable to those of excimer lasers. The frequency tripling can be internal or external. The design approach to the resonator of the inventive laser is radically different from that of conventional prior-art solid-state lasers, enabling production of a near-infrared beam having an elongated cross-section and $M^2$ values that are significantly greater than 10 in one transverse axis and 50 in an orthogonal transverse axis. This design approach provides that the $M^2$ values of the near-infrared beam are multiplied in the frequency-tripling process to values as high as 60 in the one transverse axis and 400 in the orthogonal transverse axis. Ultraviolet output beams of several of the inventive lasers can be combined in the manner used to combine the output beams of prior-art ultraviolet excimer lasers.

The present invention is described above in terms of preferred embodiments. The invention, however, is not limited by the embodiments described and depicted herein. Rather, the invention is limited only by the claims appended hereto.

What is claimed is:

1. Optical apparatus for annealing a layer on a substrate, comprising:
a plurality of repetitively-pulsed solid-state lasers, each laser thereof configured for delivering an output beam having a wavelength in the ultraviolet region of the electromagnetic spectrum, and each laser thereof including:
a laser resonator and the laser resonator including a gain crystal in a form of a slab that is energized by optical pumping to provide a gain volume in the gain crystal,
wherein the gain crystal is end pumped by pump radiation along a propagation axis in the gain crystal to provide the gain volume,
wherein mutually-orthogonal first and second transverse axes are orthogonal to the propagation axis,
wherein the gain volume has first and second dimensions respectively in the first and second transverse axes, and
wherein the energized laser resonator produces a fundamental radiation beam along the propagation axis, wherein the fundamental radiation beam is frequency converted into the output beam,
each output beam having a cross-section in the first and second transverse axes, a beam-quality factor $M^2$ in the first transverse axis greater than 50, a beam-quality factor $M^2$ in the second transverse axis greater than 20, laser pulses having a pulse-energy greater than 100 millijoules, and a pulse-repetition frequency greater than 100 hertz; and
a line-projector arranged to receive the output beams, form the output beams into a line-beam, and project the line-beam onto the layer, the line-beam having a length and a width on the layer.

2. The apparatus of claim 1, wherein the line projector includes at least one beam homogenizer configured such that each output beam contributes to the entire length of the line-beam.

3. The apparatus of claim 1, wherein, the pump radiation in each frequency-converted repetitively-pulsed solid-state laser is provided by one or more diode-laser arrays.

4. The apparatus of claim 3, wherein the pump radiation is elongated in each frequency-converted repetitively-pulsed solid-state laser such that the first transverse axis dimension is greater than or equal to three-times the second transverse axis-dimension, a gain area defined by the first and second dimensions acting a soft aperture within the laser resonator.

5. The apparatus of claim 4, wherein the laser-resonator is formed between first and second resonator mirrors having optical power in the second transverse axis only.

6. The apparatus of claim 3, wherein the laser resonator is formed between first and second resonator mirrors, and the fundamental radiation beam has a wavelength in the near-infrared region of the electromagnetic spectrum being characteristic of the gain crystal, the laser-resonator being configured such that it delivers the fundamental radiation beam to first and second optically nonlinear crystals in numeric sequence, the first optically nonlinear crystal being arranged to generate a second-harmonic radiation beam from the fundamental radiation beam, the second optically nonlinear crystal being arranged to generate the output beam by sum-frequency mixing the second-harmonic radiation beam with a residual fundamental-radiation beam after the generation of the second-harmonic radiation beam.

7. The apparatus of claim 6, wherein the gain crystal in each frequency-converted repetitively-pulsed solid-state laser is one of ytterbium doped yttrium aluminum garnet (YAG) or yttrium orthovanadate ($YVO_4$) such that the output beam has a wavelength in a range from 340 nanometers to 360 nanometers.

8. The apparatus of claim 1, wherein the gain crystal in each frequency-converted repetitively-pulsed solid-state laser is located between a high-reflection resonator mirror and an output-coupling resonator mirror, and a reflectivity of the output-coupling resonator mirror is selected such that the laser pulses have a full-width at half maximum pulse-duration greater than 10 nanoseconds.

9. The apparatus of claim 1, wherein each frequency-converted repetitively-pulsed solid-state laser includes a polarizer located in the resonator such that the output beam is linearly polarized.

10. The apparatus of claim 6, wherein each frequency-converted repetitively-pulsed solid-state laser has a resonator length between the first and second resonator mirrors, optical powers of the first and second resonator mirrors, and a propagation distance in the first optically nonlinear crystal selected such that the $M^2$ value of the second-harmonic radiation beam in the first transverse axis is at least twice the $M^2$ value of the fundamental radiation beam in the first transverse axis, and the $M^2$ value of the second-harmonic radiation beam in the second transverse axis is greater than the $M^2$ value of the fundamental radiation beam in the second transverse axis.

11. The apparatus of claim 10, wherein each frequency-converted repetitively-pulsed solid-state laser has a propagation distance in the second optically nonlinear crystal selected such that the beam-quality factor $M^2$ of the output beam in the first transverse axis is greater than 200.

12. The apparatus of claim 10, wherein each frequency-converted repetitively-pulsed solid-state laser has a propagation distance in the second optically nonlinear crystal selected such that the $M^2$ values of the output beam in the first and second transverse axes are greater than the corresponding values of the second harmonic radiation beam.

13. The apparatus of claim 10, wherein each frequency-converted repetitively-pulsed solid-state laser has a propagation distance in the second optically nonlinear crystal selected such that the $M^2$ value of the output beam in the first transverse axis is greater than 1.5-times the $M^2$ value of the second-harmonic radiation in the first transverse axis.

14. The apparatus of claim 10, wherein each frequency-converted repetitively-pulsed solid-state laser has a propagation distance in the second optically nonlinear crystal selected such that the $M^2$ value of the output beam in the first transverse axis is greater than 1.5-times the $M^2$ value of the residual fundamental radiation beam in the first transverse axis.

* * * * *